(12) United States Patent
Dol et al.

(10) Patent No.: US 11,564,400 B2
(45) Date of Patent: Jan. 31, 2023

(54) HARDSTOCK FAT COMPOSITION

(71) Applicant: UPFIELD EUROPE B.V., JL Rotterdam (NL)

(72) Inventors: Georg Christian Dol, AT Vlaardingen (NL); Frederik Michiel Meeuse, AT Vlaardingen (NL); Jan Alders Wieringa, AT Vlaardingen (NL)

(73) Assignee: UPFIELD EUROPE B.V., Rotterdam (NL)

( * ) Notice: Subject to any disclaimer, the term of this patent is extended or adjusted under 35 U.S.C. 154(b) by 113 days.

(21) Appl. No.: 16/956,977

(22) PCT Filed: Apr. 10, 2018

(86) PCT No.: PCT/EP2018/059115
§ 371 (c)(1),
(2) Date: Jun. 22, 2020

(87) PCT Pub. No.: WO2019/120632
PCT Pub. Date: Jun. 27, 2019

(65) Prior Publication Data
US 2020/0397011 A1  Dec. 24, 2020

(30) Foreign Application Priority Data
Dec. 22, 2017  (EP) .................................... 17210045

(51) Int. Cl.
*A23D 7/00* (2006.01)
*A23D 9/05* (2006.01)

(52) U.S. Cl.
CPC ............... *A23D 7/003* (2013.01); *A23D 9/05* (2013.01)

(58) Field of Classification Search
CPC .................................. A23D 7/003; A23D 9/05
See application file for complete search history.

(56) References Cited

U.S. PATENT DOCUMENTS

| | | |
|---|---|---|
| 2010/0291283 A1 | 11/2010 | Andou et al. |
| 2013/0196046 A1 | 8/2013 | Sekiguchi et al. |
| 2015/0208683 A1 | 7/2015 | Flöter et al. |

FOREIGN PATENT DOCUMENTS

| | | |
|---|---|---|
| EP | 1651338 A1 | 5/2006 |
| EP | 1865786 A2 | 12/2007 |
| WO | WO2005/014158 A1 | 2/2005 |
| WO | WO2006/087091 A2 | 8/2006 |
| WO | WO2015/176872 A1 | 11/2015 |
| WO | WO 2017/084886 A1 | 5/2017 |
| WO | WO2017/084908 A1 | 5/2017 |
| WO | WO2017/084909 A1 | 5/2017 |
| WO | WO2017/084910 A1 | 5/2017 |

OTHER PUBLICATIONS

International Search Report dated Jun. 21, 2018 regarding PCT/EP2018/059115 in English translation.

*Primary Examiner* — Deborah D Carr
(74) *Attorney, Agent, or Firm* — Arentfox Schiff LLP

(57) ABSTRACT

A hardstock fat composition for use in making edible water-in-oil emulsions such as spreads, in particular (but not exclusively) when produced using the hardstock in the form of micronized fat powder, and process to use such hardstock fat to make a fat slurry and to make a water-in-oil emulsion (like spreads) using such hardstock fat. The hardstock fat may give improved properties of the resulting emulsion.

15 Claims, No Drawings

HARDSTOCK FAT COMPOSITION

CROSS-REFERENCE TO RELATED APPLICATIONS

This is a national phase entry of PCT/EP2018/059115 filed Apr. 10, 2018, which claims priority to European Patent Application No. 17210045.5 filed Dec. 22, 2017, the entire contents of each of which is hereby incorporated by reference in its entirety.

FIELD OF THE INVENTION

The present invention relates to a hardstock fat composition. More specifically, the invention relates to a hardstock fat composition, e.g. in the form of a blend, which is free from hydrogenated fat. The invention further relates to a process for preparing a fat slurry of said hardstock fat and oil, and to a process for obtaining a spreadable water-in-oil emulsion which contains the hardstock fat of the invention.

BACKGROUND OF THE INVENTION

Fat continuous food products are well known in the art and include for example shortenings comprising a fat phase and water in oil spreads like margarine comprising a fat phase and an aqueous phase.

The fat phase of margarine and similar edible fat continuous spreads is often a mixture of liquid oil (i.e. fat that is liquid at ambient temperature) and fat which is solid at ambient temperatures. The solid fat (solid at 20° C.), also called structuring fat or hardstock fat, serves to structure the fat phase (being the case in for example a shortening as well as in a water in oil emulsion) and helps to stabilize the aqueous phase, if present, by forming a fat crystal network. It will be clear that the properties of the hardstock will be of influence on various properties of the spread in which it is used, e.g. w.r.t. stability of the emulsion, water droplet size and droplet size distribution, ease of spreading, and other properties. For a margarine or spread, ideally the hardstock fat has such properties that it melts or dissolves at mouth temperature, as otherwise the product may have a heavy and/or waxy mouthfeel.

Important aspects of a fat-continuous emulsion like for example margarine or spread are for example hardness, spreadability and ability to withstand temperature cycling. Temperature cycling means that the product is subjected to low and high temperatures (e.g. when the consumer takes the product out of the refrigerator and leaves it for some time at the table prior to use). This may have a negative influence on the structure of the spread (like for example destabilization of the emulsion or oil-exudation).

Generally edible fat continuous food products like shortenings and margarines and similar edible fat continuous spreads are prepared according to prior art processes that encompass the following steps:

1. Mixing of the liquid oil, the structuring fat and if present the aqueous phase at a temperature at which the structuring fat is definitely liquid;
2. cooling of the mixture under high shear to induce crystallization of the structuring fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

A disadvantage of such votator or churn processes is that the complete composition (including the liquid oil, structuring fat and if present the aqueous phase) is subjected to a heating step and a cooling step. This requires a lot of energy. For a spread comprising for example 6 wt % structuring fat the whole composition (100 wt %) has to be heated and cooled. A further disadvantage of the known processes is that the product or an ingredient of it may deteriorate due to the changes in temperature caused by the heating and cooling step.

Alternative processes have been described wherein the structuring fat is added as fat powder (i.e. crystallized fat) thereby eliminating the need to heat the whole composition to above the melting temperature of the structuring fat.

EP 1865786-A discloses a process for the preparation of a spreadable edible dispersion in which the hardstock fat which gives structure and stability to the emulsion is first made into a powder of which the particles have a microporous structure of submicron size particles. In this process of making the emulsion a mixture of oil and said powder of hardstock fat is subjected to stirring (at a temperature below the melting point of the fat of the structuring agent particles) and an aqueous phase is gradually added to the mixture so obtained until a dispersion is obtained. Suitable methods to prepare a fat powder for such a process include for example cryo-crystallization, in which atomized liquid droplets come in contact with liquid nitrogen causing the droplets to instantaneously solidify, and Super Critical Melt Micronisation (ScMM), also known as particles from gas saturated solutions (PGSS). ScMM is a commonly known method and is for example described in J. of Supercritical Fluids 43 (2007) 181-190 and EP1651338. For some applications fat powders prepared by this super critical melt micronisation (micronized fat powders) are preferred.

What the methods as above and other methods of manufacturing spreadable water-in-oil emulsions such as spreads have in common is that they involve the use of a hardstock fat (also named structuring fat, or for short hardstock). As stated above, the hardstock fat should have such properties that it melts or dissolves at or near mouth temperature, as otherwise the product may have a heavy and/or waxy mouthfeel, yet it should be largely solid at domestic fridge temperatures. Within these boundaries there is still wide variation (e.g. steepness and shape of the melting curve), also on properties of the spread such as stability of the emulsion, water droplet size and droplet size distribution, ease of spreading, and other properties. Put differently, the properties of the hardstock fat or structuring fat will be of influence on the properties of the spread.

Spreadable water-in-oil emulsions such as spreads preferably have a small water droplet size (e.g. a droplet size $d_{3,3}$ below 15 micron, more preferably below 10 micron, most preferably between 5 and 10 micron), and/or a water droplet size distribution as expressed by $e^\sigma$ (e-sigma) which is preferably small (preferably below 3, more preferably below 2). Also, the spreads should preferably have a good spreadability (e.g. as expressed by a standardized test on spreading, which e.g. scores on the ability to be spread in a smooth and homogenous way), preferably without leaving many vacuoles, preferably no free moisture upon spreading, and preferably also a low level of coarseness. Also, it is desired that a spread should not display much free water in a standardized test on such. The above properties apply to a spread after manufacture, but even more so after having been subjected to temperature cycling tests, as such is representative of what happens with a tub of spread in a domestic setting: out of the fridge and on the table being exposed to a temperature of 21° C. for e.g. 45 minutes, back in the fridge for a few hours, back on the table for 45 minutes, etcetera. As mentioned, a hardstock has quite some influence on the quality of a spread, in particular on the properties as set out above.

SUMMARY OF THE INVENTION

Hence, it is an object of the present invention to provide a new hardstock fat (blend), which does not contain partially hardened fat (as trans-fatty acids are not desired), and which preferably does not contain fully hardened fat, and which hardstock fat (blend) should preferably result in one or more favourable properties as set out above (on water droplet size, water droplet size distribution, spreadability, free water). In particular, such hardstock fat (blend) should perform well when used in the process for making spreads which involves micronized fat powder from the Super Critical Melt Micronisation (ScMM) process (also known as particles from gas saturated solutions: PGSS). ScMM is a commonly known method and is for example described in J. of Supercritical Fluids 43 (2007) 181-190 and EP1651338, and the latter and many other patent applications describe how such micronized fat particles of a hardstock fat can be used in making edible spreadable water-in-oil emulsions.

It has now been found, that the above objective may be met (at least in part) by an edible hardstock fat comprising at least 90% by weight on the edible hardstock fat of triglyceride fat, said triglyceride fat comprising the following triacylglycerides, in weight % on total triglycerides:

PPP from 20% to 30%
H2M from 24% to 32%
H2U from 8% to 12.5%, wherein P denotes the residue of palmitic acid, M denotes the residue of from 10 to 14 carbon atoms (i.e. including capric acid, lauric acid, myristic acid), U denotes the residue of oleic acid or linoleic acid and H denotes the residue of a saturated fatty acid with more than 15 carbon atoms, and wherein said hardstock fat does not contain hydrogenated fats.

Herein, PPP stands for triglycerides of only palmitic acids. H2M stands for those triglycerides that have two fatty acid moieties that are saturated and have a length of 16 carbon atoms or longer, and one fatty acid moiety that is saturated and has a length of 10 to 14 carbon atoms (i.e. HHM and HMH). H2U stands for those triglycerides that have two fatty acid moieties that are saturated and have a length of 16 carbon atoms or longer, and one fatty acid moiety that is unsaturated and has a length of 18 carbon atoms (i.e. HHU and HUH).

DETAILED DESCRIPTION OF THE INVENTION

In the present invention, the hardstock fat comprises in majority a triglyceride fat. Most conventional hardstock fats are or consists for a large part of triglcyeride fats, such as e.g. stearin fractions of palm oil or palm kernel oil. However, other fatty materials are occasionally also used as part of a hardstock fat, such as e.g. plant sterols or plant stanols or esters thereof. However, in the present invention, it is preferred that the hardstock fat comprises triglyceride fat in an amount of at least 98% by weight on said fat powder of the hardstock fat. More preferably, the hardstock fat consists of the triglyceride fat of the invention, i.e. that the edible hardstock fat of triglyceride fat consists of triglyceride fat comprising the following triacylglycerides, in weight % on total triglycerides:

PPP from 20% to 30%
H2M from 24% to 32%
H2U from 8% to 12.5%, wherein P denotes the residue of palmitic acid, M denotes the residue of from 10 to 14 carbon atoms (i.e. including capric acid, lauric acid, myristic acid), U denotes the residue of oleic acid or linoleic acid and H denotes the residue of a saturated fatty acid with more than 15 carbon atoms, and wherein said hardstock fat does not contain hydrogenated fats. Preferably, for a good function, the hardstock fat according to the present invention which comprises less than 2% by weight on the edible hardstock fat of water.

In the present invention it was found that by carefully choosing the fat component(s) that make up the hardstock fat (blend) the desired properties can be obtained. More specifically, it was found that the hardstock fat which gave preferred properties comprises a substantial portion of triglycerides (at least 90% by weight on the edible hardstock fat being triglyceride fat, as stated above), and more preferably that said hardstock fat consists of the triglyceride fat defined above with the triacylglyceride composition. It was also found that the triglycerides in the hardstock fat should have a certain number of saturated fatty acids. More specifically, it was found that it is preferred that of the hardstock fat according to the present invention, said triglyceride fat comprises saturated fatty acid residues in an amount of at least 50%, preferably in an amount of at least 60%, more preferably at least 75% by weight on all fatty acid residues present in triglycerides. Likewise, it was found that a certain part of the triglyceride fat of the hardstock fat comprises triglycerides of only palmitic acid. Thus, it is preferred that of the hardstock fat according to the present invention said triglyceride fat comprises PPP triacylglycerides in an amount of from 21% to 28%, in weight % on total triglycerides, wherein P stands for palmitic acid, and PPP stands for triglycerides of only palmitic acids. Similarly, it was found that of the triglycerides in the hardstock fat according to the invention said triglyceride fat comprises H2M triacylglycerides in an amount of from 26% to 30%, in weight % on total triglycerides in the hardstock, wherein M denotes the residue of from 10 to 14 carbon atoms (i.e. including capric acid, lauric acid, myristic acid) and H denotes the residue of a saturated fatty acid with more than carbon atoms. H2M stands for those triglycerides that have two fatty acid moieties that are saturated and have a length of 16 carbon atoms or longer, and one fatty acid moiety that is saturated and has a length of 10 to 14 carbon atoms (i.e. HHM and HMH).

Presence of some unsaturated fatty acid as part of the triglyceride hardstock fat is preferred. More specifically, it is preferred that of the triglycerides in the hardstock fat according to the present invention, said triglyceride fat comprises H2U triacylglycerides in an amount of from 9% to 12%, in weight % on total triglycerides, wherein U denotes the residue of oleic acid or linoleic acid and H has the meaning as set out above. More preferably, the hardstock fat according to the above invention has at least two of the above preferred embodiments (w.r.t. amount of triglycerides, presence of water, amount of saturated fatty acid residues present in triglycerides, amount of triglyceride fat comprising PPP triacylglycerides, and/or H2M triacylglycerides and/or H2U triacylglycerides). H2U stands for those triglycerides that have two fatty acid moieties that are saturated and have a length of 16 carbon atoms or longer, and one fatty acid moiety that is unsaturated and has a length of 18 carbon atoms (i.e. HHU and HUH).

Generally, hardstock fats for use in edible water in oil emulsions such as those according to the invention have a certain melting behaviour. This is a result of the various triglycerides being present in the hardstock fat as set out above. More generally, the edible hardstock fat according to the present invention has a melting behaviour as specified by a solid fat content N10 from 60 to 100, N20 from 50 to 100, and N35 from 5 to 65.

The hardstock fat of the invention was specifically designed for performance in the process for making spreads which involves mixing micronized fat powder from the Super Critical Melt Micronisation (ScMM) process (also known as particles from gas saturated solutions (PGSS) with an oil to provide a slurry or dispersion of fat crustals in oil, which dispersion or slurry can be mixed with an aqueous phase to provide an edible water-in-oil emulsion. ScMM is a commonly known method and is for example described in J. of Supercritical Fluids 43 (2007) 181-190 and EP1651338, and the latter and many other patent applications describe how such micronized fat particles of a hardstock fat can be used in making edible spreadable water-in-oil emulsions. Following this, it is preferred that in the present invention said hardstock fat is in the form of a fat powder, preferably a micronized fat powder. As mentioned, such (micronized) fat powder can be blended with an edible oil to provide (provided the temperature remains below the melting point of the hardstock fat) a slurry or dispersion of fat crystals dispersed in oil. Consequently, the invention further relates to a process for preparing a fat slurry or fat dispersion, said process comprising the step of blending an edible (liquid) oil with 2 to 20% by weight (on the fat slurry) of fat powder according to the present invention. The oil in such process is preferably a vegetable oil, such as sunflower oil, rapeseed oil, soybean oil, and mixtures thereof.

A slurry or dispersion so-obtained can be made into a water-in-oil emulsion by mixing with an aqueous phase to form an emulsion. This process as such, with other hardstock fats, is well known and described in EP1651338 and many other patent applications. Such process can be conveniently be carried out using the hardstock fat according to the present invention. Thus, the present invention further relates to a process for preparing an edible water-in-oil emulsion, which process comprises the step of mixing a fat slurry prepared by the process according to the present invention and as set out in the previous paragraph, with an aqueous phase and emulsifying the aqueous phase.

It is believed the presently claimed hardstock fat can also be used beneficially in other processes for making (spreadable) edible water-in-oil emulsions, in particular in processes in which a melted hardstock fat is blended with a cold oil phase or a cold water and oil dispersion. Such processes are set out e.g. in: WO 2015/176872, WO 2017/084886, WO2017/084908, WO2017/084909, and WO2017/084910. Thus, the present invention further relates to a process for preparing a fat slurry or dispersion, wherein edible oil at a temperature of between −5 to +20° C. is mixed with 2 to 30% by weight on the fat slurry of a melted edible hardstock fat according to the present invention. The fat slurry or dispersion so-obtained can then be mixed with an aqueous phase and emulsified to form an edible water-in-oil emulsion in the same way as the process referred to in the previous paragraph.

It is also believed the hardstock fat blend according to the present invention can be beneficially used in a conventional votator process. Thus, the present invention further relates to a process for preparing an edible water-in-oil emulsion, said process comprising the steps of preparing a blend of:
to 30% by weight on the emulsion of edible hardstock fat according to the present invention,
to 90% by weight on the emulsion of an edible oil, and
to 60% by weight on the emulsion of an aqueous phase,
ensuring all components in the blend are melted or dissolved, and processing said blend in a scraped surface heat exchanger such that an edible water-in-oil emulsion is obtained.

The hardstock fat blend according to the present invention is preferably utilised in processes for making edible water-in-oil emulsions which are spreadable. Such emulsions are often referred to as spreads. Such spreads typically have a hardness which corresponds to a Stevens value of between 50 and 500 (preferably between 70 and 300). As spreads immediately after production can be fairly soft and as they gain in firmness after a few days chilled storage (in fact the gaining firmness after a few days chilled storage is used in commercial production of spreads), the Stevens value of 50 to 500 (preferably between 70 and 300) is not to be measured immediately after production, but after at least 5 days chilled (at temperature between 2 and 10° C.) storage after production. Hence, the present invention further relates to processes for making edible spreadable water-in-oil emulsions, wherein the emulsion so-prepared has a Stevens value of 50 to 500 (when measured after at least 5 days chilled storage after production). The Stevens value for this can be determined according to the following protocol.

Products are to be stabilized at 5 degrees Celsius. The Stevens value can then be measured with a Stevens penetrometer (Brookfield LFRA Texture Analyser (LFRA 1500), ex Brookfield Engineering Labs, UK) equipped with a stainless steel probe with a diameter of 6.35 mm and operating such in "normal" mode. Measurements are to be carried out in a standard 250 ml product tub (120*80*45 mm (LWH). The probe is to be pushed into the product at a speed of 2 mm/s, a trigger force of 5 gram from a distance of 10 mm. The force required is to be read from the digital display and is expressed in grams.

EXAMPLES

Compositions

Spreads were made according to the basic formulation of Table 1. Different hardstock compositions (comparatives I to IV, and one according to the invention) were used in the form of fat powder, while also some process conditions were varied.

TABLE 1

Spreads composition used in the experimental validation study.

| ingredient | amount (w/w-%) |
| --- | --- |
| Soy bean oil | 39.4 |
| Hardstock (in the form of fat powder) | 5.4 |
| Lecithin (Soy lecithin ex DuPont) | 0.2 |
| Total fat phase | 45.0 |
| Demi-water | 53.35 |
| Salt (NaCl) | 1.65 |
| Total water phase | 55.0 |

Five varying hardstock fat compositions were used, shown in Table 2. These were built up from several fractionated and interesterified fats. The fats were characterized (calculated) with respect to the content of three compositional fractions:
tripalmitin (glycerol tripalmitate, PPP)
a group of triglycerides designated as H2M
a group of triglycerides designated as H2U
Herein have PPP, H2M and H2U the meaning as set out in the description of the invention.

TABLE 2 hardstock fat blend compositions

| Fat blend | Composition (%) | | | | | Content (%) | | |
|---|---|---|---|---|---|---|---|---|
| | inES48 | mfPOs | dfPOm | dfPKs | inES52 | PPP | H2M | H2U |
| Comp 1 | 68.46 | | 21.08 | 3.93 | 6.53 | 13.0 | 18.9 | 24.0 |
| Comp II | 0.13 | | 1.07 | 30.15 | 68.66 | 12.6 | 27.7 | 4.4 |
| 1 | 46.53 | 13.08 | 0.58 | | 39.81 | 23.0 | 27.0 | 11.0 |
| Comp III | 100.0 | | | | | 16.8 | 23.6 | 13.6 |
| Comp IV | 80.00 | 13.0 | | 7.0 | | 21.3 | 29.5 | 13.2 |

In the above table:

inES48 is an interesterified mixture of 65% dry fractionated palm oil stearin with an Iodine Value of 14 and 35% palm kernel oil mfPOs is a stearin fraction of palm oil obtained by multistage dry fractionation dfPOm is a palm oil mid fraction obtained by dry fractionation dfPKs is a stearin fraction of palm kernel oil obtained by dry fractionation inES52 is an interesterified stearin fraction obtained by wet fractionation of an interesterified mixture of 57% palm oil stearin obtained by multistage dry fractionation, having a iodine value of 14, and 43% of stearin fraction of palm kernel oil obtained by dry fractionation.

Process

The spreads were made using the following process.

Fat powders were sprayed using the ScMM process, which process was also described in patent WO 2010/069746. The $CO_2$ concentration used in the process was 47%. Conditions were chosen such that the $CO_2$ was supercritical during mixing with the melted fat. The fat is then sprayed over a nozzle, collected in the form of a fine powder and stored at chilled conditions (5° C.).

Next the fat powder was mixed with soy bean oil (19° C.) in which lecithin was dissolved and recirculated over a high shear mixer under vacuum conditions. This results in a fat dispersion of fat crystals dispersed in oil of about 20° C. The mixing was continued for 19 minutes.

The fat dispersion was mixed with the water phase in a continuous process, using a pin stirrer (1.5 litre C-unit, 100 kg/h, operated at a speed of 2000 rpm) to obtain the fat-continuous spread.

The products so-obtained were analysed regarding:
Stevens hardness
droplet size ($d_{3,3}$)
droplet size distribution $e^\sigma$ (e-sigma, via NMR)
spreading
free water These properties were determined directly after production and at several times during storage, up to 4 weeks at 5° C. The storage testing also included temperature cycles according to the following protocols:

TABLE 3 temperature cycling conditions.

| protocol | Temperature conditions |
|---|---|
| B | 2 days 25° C.; 4 days 15° C.; 1 day 10° C. |
| B2 | As B, followed by: 1 day 25° C.; 1 day 5° C.; 1 day 25° C.; 1 day 5° C.; 1 day 25° C.; 1 day 5° C.; 1 day 10° C. |

TABLE 3-continued temperature cycling conditions.

| protocol | Temperature conditions |
|---|---|
| C | 2 days 30° C.; 4 days 15° C.; 1 day 10° C. |
| C2 | As C, followed by: 1 day 25° C.; 1 day 5° C.; 1 day 25° C.; 1 day 5° C.; 1 day 25° C.; 1 day 5° C.; 1 day 10° C. |

Analysis Methods

Water droplet size distribution of W/0 emulsions

The normal terminology for Nuclear Magnetic Resonance (NMR) is used throughout this method. On the basis of this method the parameters $d_{3,3}$ and $\exp(\sigma)$ of a lognormal water droplet size distribution can be determined. The $d_{3,3}$ is the volume weighted mean droplet diameter (in microns, in the present case) and $e^\sigma$ (e-sigma) is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the 20 sequence by a relaxation filter. The ratio (R=E/E*) reflects the extent of restriction of the translational mobility of the water molecules in the water droplets and thereby is a measure of the water droplet size. By a mathematical procedure—which uses the lognormal droplet size distribution—the parameters of the water droplet size distribution $d_{3,3}$ (volume weighed geometric mean diameter) and $e^\sigma$ (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

Spreadibility

Spreadibility is determined according to the following protocol.

A flexible palette knife is used to spread a small amount of the spread on to fat free paper. The spreading screen is evaluated according to standardized scaling. A score of 1 represents a homogeneous and smooth product without any defects, a 2 refers to the same product but then with small remarks as slightly inhomogeneous or some vacuoles, a 3 refers to the level where defects become almost unacceptable, like loose moisture or coarseness during spreading. A score of 4 or 5 refers to unacceptable products, where the 4 refers to a product still having some spreading properties, but an unacceptable level of defects.

Free Water

After spreading a sample of a fat spread, the presence of free water was determined by using indicator paper (Wator, ref 906 10, ex Machery-Nagel, DE) which develops dark spots where free water is absorbed.

A six point scale is used to quantify the quality of fat spread (DIN 10 311):
- 0 (zero) is a very stable and good product showing no perceivable coloring of the paper;
- 1 (one) some loss of moisture (one or two spots, or the paper changes a little in color as a total);
- 2 (two) as one but more pronounced;
- 3 (three) as one but with a clear spots and color change of the paper;
- 4 (four) indicator paper completely changes into a darker color;
- (five) the paper darkens completely and fast into the maximum level of color intensity.

The same indicator paper is also used to observe free water on the product surface, when it is still in its pack. The same six point scale is then used.

Scoring Criteria

TABLE 4 scoring criteria for measurements of droplet sizes, spreading characteristics and occurrence of free water.

| | $d_{3,3}$ (μm) | E-sigma | Spreading | Free water |
|---|---|---|---|---|
| G = Good | <10 | <2 | Score 1-2 | 0-1 |
| I = Intermediate | 10-20 | 2-3 | | 2-3 |
| B = Bad | >20 | >3 | Score 3-5 | 3-4 |

For any given storage condition (direct, after chilled storage or after temperature cycling), the different scores are also combined into an overall score.

The overall score is determined by the worst score obtained (one of G, I, B) for each of the four criteria: droplet size, E-sigma, spreading, free water.

Results

The products made with the different hardstock fat compositions (according to the invention and comparatives) had clearly different properties. An overview is provided in Tables 5a-c.

Table 5a shows the results of droplet size measurements. It can be seen that hardstock fat blend 1 leads to the smallest droplet sizes. In addition, only hardstock fat blend 1 leads to values of $e^\sigma$ that are scored as 'good'.

Table 5b shows that hardstock fat blends 1 and Comparative IV have comparable scores on spreading and free water, which are better than found with the other blends.

Table 5c shows the combined quality scores. Overall, these results show that composition 1 leads to the best product properties according to the defined criteria.

TABLE 5a

Results of droplet size measurements

| | | | | | | | |
|---|---|---|---|---|---|---|---|
| C-2 Cycle | $e^\sigma$ | | 2.14 | — | 1.84 | 2.74 | 2.12 |
| | $d_{3.3}$ | μm | 9.28 | — | 5.84 | 7.96 | 6.25 |
| C-Cycle | $e^\sigma$ | | 2.12 | — | 1.88 | 2.80 | 2.10 |
| | $d_{3.3}$ | μm | 8.37 | — | 5.93 | 7.80 | 6.20 |
| B2-Cycle | $e^\sigma$ | | 2.21 | — | 1.88 | 2.77 | 2.09 |
| | $d_{3.3}$ | μm | 7.75 | — | 5.82 | 7.34 | 5.94 |
| B-Cycle | $e^\sigma$ | | 2.27 | — | 1.88 | 2.80 | 2.06 |
| | $d_{3.3}$ | μm | 6.90 | — | 5.99 | 7.40 | 5.81 |
| 4 wks | $e^\sigma$ | | 2.37 | — | 1.89 | 2.76 | 2.15 |
| | $d_{3.3}$ | μm | 7.26 | — | 5.77 | 7.13 | 6.00 |
| Direct | $e^\sigma$ | | 2.20 | — | 1.91 | 2.50 | 2.08 |
| | $d_{3.3}$ | μm | 7.10 | — | 5.86 | 7.40 | 5.97 |
| Hardstock fat blend | | | Comp I | Comp II | 1 | Comp III | Comp IV |

TABLE 5b

Results of spreading and free water measurements

| | | | | | | | |
|---|---|---|---|---|---|---|---|
| C2-Cycle | Free water on product | score 0-5 | 0 | — | 0 | 3 | 1 |
| | Free water after spreading | score 0-5 | 0 | — | 0 | 2 | 0 |
| | Spreading score | score 1-5 | 2 | — | 2 | 3 | 2 |
| C-Cycle | Free water on product | score 0-5 | 0 | — | 0 | 3 | 0 |
| | Free water after spreading | score 0-5 | 0 | — | 0 | 1 | 0 |
| | Spreading score | score 1-5 | 2 | — | 1 | 2 | 1 |
| B2-Cycle | Free water on product | score 0-5 | 0 | — | 0 | 2 | 0 |
| | Free water after spreading | score 0-5 | 0 | — | 0 | 2 | 0 |
| | Spreading score | score 1-5 | 2 | — | 2 | 3 | 1 |
| B-Cycle | Free water on product | score 0-5 | 0 | — | 0 | 3 | 0 |

TABLE 5b-continued

Results of spreading and free water measurements

|  |  |  |  |  |  |  |  |
|---|---|---|---|---|---|---|---|
|  | Free water after spreading | score 0-5 | 0 | — | 0 | 2 | 0 |
|  | Spreading score | score 1-5 | 2 | — | 1 | 3 | 2 |
| 4 wks | Free water on product | score 0-5 | 0 | — | 0 | 3 | 0 |
|  | Free water after spreading | score 0-5 | 0 | — | 0 | 2 | 0 |
|  | Spreading score | score 1-5 | 1 | — | 1 | 3 | 1 |
| Direct | Free water on product | score 0-5 | 0 |  | 0 | 4 | 1 |
|  | Spreading score |  | n.a. | n.a. | n.a. | n.a. | n.a. |
|  | Fat |  | C-I | C-II | 1 | C-III | C-IV |

TABLE 5c

Combined product quality scores

| Hardstock fat blend | Overall score direct | Overall score after 4 weeks | Overall score after B cycle | Overall score after B2 cycle | Overall score after C cycle | Overall score after C2 cycle |
|---|---|---|---|---|---|---|
| Comp I | I | I | I | I | I | I |
| Comp II | B | B | B | B | B | B |
| 1 | G | G | G | G | G | G |
| Comp III | B | B | B | B | I | B |
| Comp IV | I | I | I | I | I | I |

The invention claimed is:

1. An edible hardstock fat comprising at least 90% by weight of the edible hardstock fat of triglyceride fat, said triglyceride fat comprising the following triacylglycerides, in a weight % based on total triglycerides:
PPP from 20% to 30%
H2M from 24% to 32%
H2U from 8% to 12.5%,
wherein "P" denotes the residue of palmitic acid, "M" denotes a residue of from 10 to 14 carbon atoms, "U" denotes the residue of oleic acid or linoleic acid and "H" denotes the residue of a saturated fatty acid with more than 15 carbon atoms, and
wherein said hardstock fat does not contain hydrogenated fats.

2. The edible hardstock fat of claim 1, wherein said hardstock fat consists of said triglyceride fat.

3. The edible hardstock fat of claim 1, which comprises less than 2% by weight of the edible hardstock fat of water.

4. The edible hardstock fat of claim 1, wherein said triglyceride fat comprises saturated fatty acid residues in an amount of at least 50% by weight of all fatty acid residues present in triglycerides.

5. The edible hardstock fat of claim 1, said triglyceride fat comprising PPP triacylglycerides in an amount of from 21% to 28%, in weight % on total triglycerides.

6. The edible hardstock fat of claim 1, said triglyceride fat comprising H2M triacylglycerides in an amount of from 26% to 30%, in weight % on total triglycerides.

7. The edible hardstock fat of claim 1, said triglyceride fat comprising H2U triacylglycerides in an amount of from 9% to 12%, in weight % on total triglycerides.

8. The edible hardstock fat of claim 1, wherein the hardstock fat has a solid fat content N10 from 60 to 100, N20 from 50 to 100, and N35 from 5 to 65.

9. The edible hardstock fat of claim 1, wherein said hardstock fat is in the form of a fat powder.

10. A process for preparing a fat slurry, said process comprising the step of blending an edible oil with 2 to 20% by weight of the fat powder of claim 9.

11. A process for preparing an edible water-in-oil emulsion, which process comprises the step of mixing a fat slurry prepared by the process of claim 10 with an aqueous phase, and emulsifying the aqueous phase.

12. The process of claim 11, wherein the emulsion so-prepared has a Stevens value of 50 to 500.

13. The process of claim 11, wherein said triglyceride fat comprises saturated fatty acid residues in an amount of at least 60% by weight of all fatty acid residues present in triglycerides.

14. The process of claim 11, wherein said triglyceride fat comprises saturated fatty acid residues in an amount of at least 75% by weight of all fatty acid residues present in triglycerides.

15. The process of claim 11, wherein said hardstock fat is in the form of micronized fat powder.

* * * * *